(12) United States Patent
Xuan et al.

(10) Patent No.: US 11,833,509 B2
(45) Date of Patent: Dec. 5, 2023

(54) DIGITAL PCR CHIP WITH ON-CHIP MICRO-SLOT ARRAY BASED ON IMPEDANCE DETECTION AND ITS MANUFACTURING METHOD

(71) Applicant: ZHEJIANG UNIVERSITY, Zhejiang (CN)

(72) Inventors: Yangfan Xuan, Zhejiang (CN); Bo Zhao, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/318,701

(22) Filed: May 16, 2023

(65) Prior Publication Data

US 2023/0285961 A1    Sep. 14, 2023

Related U.S. Application Data

(63) Continuation of application No. PCT/CN2022/083898, filed on Mar. 30, 2022.

(30) Foreign Application Priority Data

Jan. 26, 2022    (CN) .......................... 202210091483.5

(51) Int. Cl.
*B01L 3/00*        (2006.01)
*G01N 27/02*    (2006.01)

(52) U.S. Cl.
CPC ... *B01L 3/502707* (2013.01); *B01L 3/502715* (2013.01); *G01N 27/021* (2013.01);
(Continued)

(58) Field of Classification Search
CPC ......... B01L 3/502707; B01L 3/502715; B01L 2300/0645; B01L 2300/12; B01L 2400/0415; G01N 27/021
(Continued)

(56) References Cited

FOREIGN PATENT DOCUMENTS

CN    103323383 B  *  6/2013  ............. G01N 15/10
CN    110218628        9/2019

OTHER PUBLICATIONS

Beijing Institute of Technology BIT, English Translation of CN 103323383 B, obtained from Google Patents on Aug. 15, 2023. (Year: 2023).*

(Continued)

*Primary Examiner* — Christine T Mui
(74) *Attorney, Agent, or Firm* — JCIPRNET

(57) ABSTRACT

Disclosed is a digital PCR chip with on-chip micro-slot array based on impedance detection and its manufacturing method. The a digital PCR chip with on-chip micro-slot array based on impedance detection includes a micro-slot array, a power management unit, a clock generation module, a digital control logic module, a driver module, an analog-to-digital converter (ADC), a backscatter module and a power-on-reset module, where the power management unit generates a standard voltage and current. The clock generation module generates clocks required for the digital module, the ADC, and an excitation for impedance test. The power-on-reset module generates a reset signal for a digital circuit, and the backscatter module completes wireless transmission of an ADC output signal to an upper computer, and the digital control logic completes sequential gating and time-division measurement of micro-slot cells.

10 Claims, 3 Drawing Sheets

(52) U.S. Cl.
CPC ... *B01L 2300/0645* (2013.01); *B01L 2300/12* (2013.01); *B01L 2400/0415* (2013.01)

(58) Field of Classification Search
USPC .................................................. 422/502, 500
See application file for complete search history.

(56) References Cited

OTHER PUBLICATIONS

"Written Opinion of the International Searching Authority (Form PCT/ISA/237) of PCT/CN2022/083898," dated Oct. 25, 2022, with English translation thereof, pp. 1-8.

\* cited by examiner

DIGITAL PCR CHIP WITH ON-CHIP MICRO-SLOT ARRAY BASED ON IMPEDANCE DETECTION AND ITS MANUFACTURING METHOD

CROSS-REFERENCE TO RELATED APPLICATION

This application is a continuation of international application of PCT application serial no. PCT/CN2022/083898 filed on Mar. 30, 2022, which claims the priority benefit of China application no. 202210091483.5 filed on Jan. 26, 2022. The entirety of each of the above mentioned patent applications is hereby incorporated by reference herein and made a part of this specification.

BACKGROUND OF THE INVENTION

Technical Field

The present disclosure belongs to the technical field of circuits, and in particular to a digital PCR chip with on-chip micro-slot array based on impedance detection and its manufacturing method.

Background Art

As the most basic and extensive technology in molecular diagnosis, polymerase chain reaction (PCR) is of great significance in the application fields of medical diagnosis, gene replication, crime forensics, archaeology, etc. Among them, the third-generation technology digital PCR (dPCR) obtains digitized data of 0 or 1 by means of differentiation and amplification of thousands of microchambers and detection of every single unit. It computes a PCR reaction result from the digitized data, achieving a brand-new, accurate and efficient absolute nucleic acid quantification technology.

With development of integrated circuits and related biosensor processes, dPCR can be integrated into a small chip and completes specific functions. With the advantages of portability, compactness, low power consumption, easy operation and low cost, a gene chip integrated with reaction microchambers, electrodes, signal chain, etc. has gradually defeated an original complex and bulky dPCR/quantitative PCR (qPCR) system, and rapidly establish markets. In order to simplify a PCR system and bring out portable and cost-effective applications, an electrochemical technology is applied to the PCR system. An PCR technology is gradually entering the markets based on electrochemical impedance spectroscopy technology (EIS). As the name implies, the technology uses the principle of measurement of electrochemical impedance, and measures the change of impedance after different PCR cycles in every microchamber unit, to determine whether the reaction is completed. A detection electrode of such a PCR system makes direct contact with a sample without pre-label and external arrangement of a complex optical instrument. By applying a stimulator at a specific frequency and amplitude to electrodes, the real and imaginary impedance of samples after different PCR cycles can be obtained for the determination of negative/positive results. Damage caused by an alternating current signal to the sample can be ignored.

Throughout the development of PCR industry, the tendency always evolves towards portability, simplicity and low power consumption. However, the existing traditional fluorescent PCR instruments do not have the advantages above, and cannot satisfy clinical use or POC (point of care) purposes which usually acquire complex procedure and costly optical instruments. What's more, the existing electrochemical PCR system usually uses voltammetry to measure impedance of the sample. In order to enhance a signal to be detected, a pre-marking process is used, which results in additional intercalation agents or requires additional fixed pre-treatment to improve a signal-to-noise ratio. Compared with the voltammetry, an EIS system effectively solves the above problem and defects by measuring complex impedance of the sample at different frequencies, while related researches and systems have either not done sample electrode contact type experiments, or only measured a relation between deoxyribonucleic acid (DNA) concentration and frequency domain impedance without real-time detection of the PCR. Moreover, with long development time and low technical thresholds of qPCR, it still occupies the vast majority of technical markets for clinical applications in molecular diagnostics nowadays. DPCR, especially dPCR based on electrical impedance measurement, still has a wide research and development space to expand.

SUMMARY OF INVENTION

The objective of the present disclosure is to provide a digital PCR chip with on-chip micro-slot array based on impedance detection and its manufacturing method, so as to solve the above technical problem.

In order to solve the above technical problem, specific technical solutions of a digital PCR chip with on-chip micro-slot array based on impedance detection and its manufacturing method of the present disclosure are as follows:

The dPCR chip with on-chip micro-slot array based on impedance detection includes a micro-slot array, a power management unit, a clock generation module, a digital control logic module, a driver module, an analog-to-digital converter (ADC), a backscatter module and a power-on reset module. The power management unit includes a rectifier, a bandgap reference and LDOs. The clock generation module includes a clock recovery module based on wireless power transmission and an on-chip relaxation oscillator. The wireless signal is accessed to the rectifier, which is connected to the power management unit. The power management unit is connected to the power-on reset module, the clock recovery module, the on-chip relaxation oscillator, the digital control logic module, and the power-on reset module. The on-chip oscillator is connected to the digital control logic module. The digital control logic module and the on-chip oscillator are connected to the micro-slot array. The micro-slot array and the power management unit are connected to the driver module. The driver module, the clock recovery module and the power management module are connected to the ADC. The ADC is connected to the backscatter module, and the backscatter module is connected to an antenna.

The micro-slot array consists of a plurality of on-chip micro-slot cells, and the micro-slot array is used as a container for PCR reactants.

The power management unit powers the chip through a wireless power supply method.

The clock recovery module based on wireless power transmission is used as a clock for the ADC; the on-chip oscillator is used as a clock for the digital control logic and serves as a square wave excitation for impedance measurement.

The digital control logic module includes a switch array, and every switch of the array is connected to each cell of the micro-slot array, while the digital control logic module generates the control codeword, complete the gating of the on-chip array in a time-division method, thus tests impedance of every single cell in a period of time.

The driver module amplifies and drives voltages at two ends of double electrodes of each micro-slot cell, to enable the voltages to drive the ADC.

The ADC is used for completing the conversion of a voltage signal from analog to digital. The ADC is with a single-ended output, and the detected serial signal is connected to the backscatter module.

The backscatter module is used for completing transmission of the wireless signal.

The power-on-reset module is used for generating a reset signal as a reset input of both digital module and the ADC.

Further, micro-slot cell consists of the chip as bulk, a cube tank and double electrodes at bottom. The mentioned cube tanks and the double electrodes are arranged on the surface of chip, and the electrodes are located in a cavity delimited by the cube tank.

Further, the double electrodes are sequentially, from bottom to top, a first adhesion layer, a second adhesion layer and an electrode layer, of which the first adhesion layer is metal Al, and the second adhesion layer is metal Cr. The layer of electrodes is made from one of metal gold (Au) and metal platinum (Pt).

Further, the first adhesion layer, the second adhesion layer and the electrode layer are combined to form an Al—Cr—Au structure.

Further, the first adhesion layer, the second adhesion layer and the electrode layer have thicknesses ranging from 10 nm to 30 nm, 5 nm to 20 nm, and 50 nm to 200 nm respectively.

Further, the cube solution tank consists of SU8 photoresist.

Further, the cube solution tank has a tank hole height and inner diameter ranging from 20 μm to 100 μm.

Further, each micro-slot cell on the chip has a density ranging from $2.5*10^9$ cell/m$^2$ to $1.2*10^7$ cell/m$^2$.

The present disclosure further discloses a manufacturing method for a micro-slot array. The method includes:

step 1, reserve the passivation regions of Al as the positions of electrodes of each micro-slot when the circuit and chip is designed.

step 2, fabricate the first adhesion layers by magnetron sputtering covering the passivation opening on the diced chip, and the first adhesion layer is metal Al.

step 3, carry out stripping in acetone, to obtain Al electrodes of micro-slot cells.

step 4, use deionized water for cleaning, sputter metal Cr and metal Au on the electrode region of the chip in the same manner as in steps 2 and 3, and then carry out stripping to obtain an Al—Cr—Au electrode.

step 5, spin SU8 photoresist on the chip, and carry out photoetching and hardening to obtain a photoresist layer, so as to form concentric-square-shaped cubic solution tanks. The concentric-square-shaped cubic solution tanks are the mentioned micro-slot cells.

step 6, finally, use a plasma machine to change hydrophilicity and hydrophobicity, to enable reactants to smoothly enter the micro-slot cells.

Further, after the deionized water is used for cleaning in step 4, the metal Cr and metal Pt are sputtered on the electrode region of the chip in the same manner as in steps 2 and 3, and stripping is carried out to obtain an Al—Cr-metal Pt electrode.

The digital PCR chip with on-chip micro-slot array based on impedance detection and its manufacturing method of the present disclosure have the following advantages: the present disclosure does not need an external text plate and a complex connection, and moreover, it uses a test principle of electrical impedance, thereby abandoning pre-label and expensive instruments which are required for a fluorescence PCR system. The present disclosure is able to accurately analyze a PCR reaction, and has a wide application prospect in the field of digital PCR analysis due to the advantages of simplicity, portability and low cost.

Description of marks in the figures: 1, chip. 2, micro-slot. 3, double electrodes at bottom. 31, first adhesion layer. 32, second adhesion layer. and 33, the layer of electrode.

DESCRIPTION OF EMBODIMENTS

In order to better understand the objective, structure and function of the present disclosure, the present disclosure of a digital PCR chip with on-chip micro-slot array based on impedance detection and its manufacturing method is further described in detail below in combination with the accompanying drawings.

Figure 1:
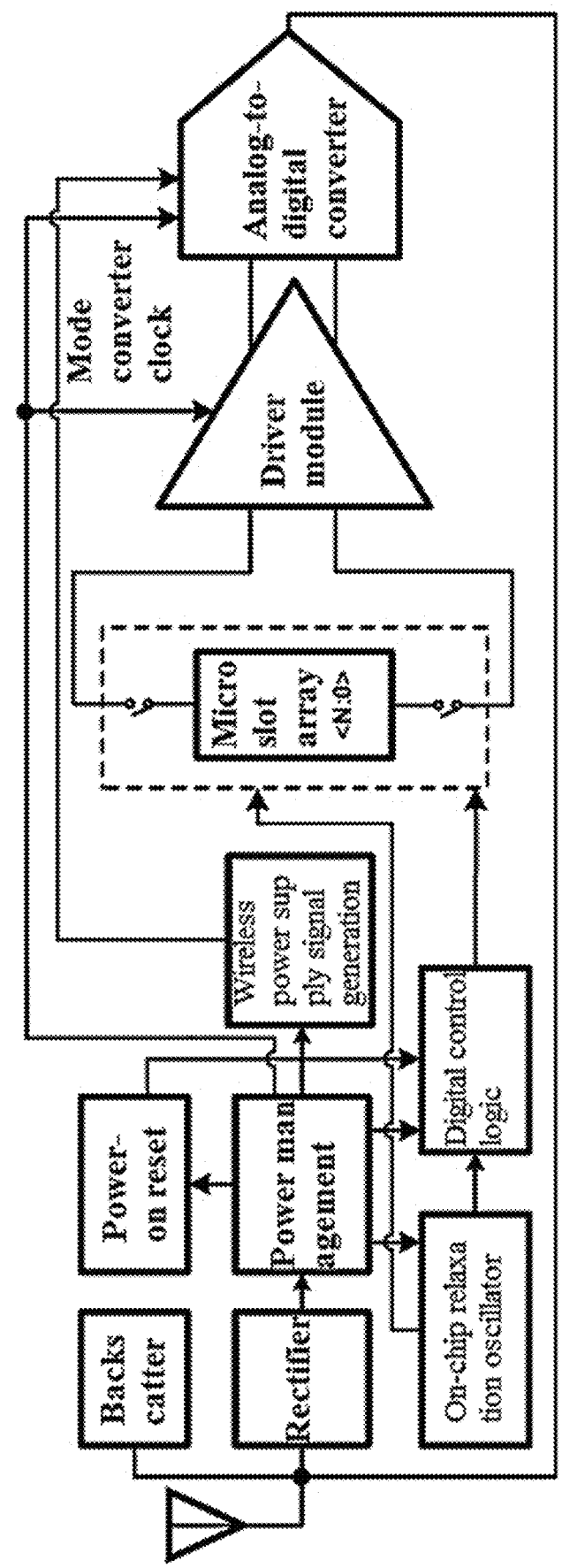
FIG. 1 is a system block diagram of the digital polymerase chain reaction (PCR) chip of the present disclosure.

As shown in FIG. 1, the present disclosure of the digital PCR chip with on-chip micro-slot array based on impedance detection includes a micro-slot array, a power supply module, a clock generation module, a digital control logic module, a driver module, an analog-to-digital converter (ADC), a backscatter module and a power-on-reset module. The power supply module includes a rectifier, a power management unit. The clock generation module includes a clock recovery module based on wireless power transmission and an on-chip relaxation oscillator.

A wireless signal is received by the rectifier, and the rectifier is connected to the power management unit, which is connected to the power-on-reset module, a clock recovery module, an on-chip relaxation oscillator and the digital control logic module. The power-on-reset module and the on-chip oscillator are connected to the digital control logic module, while the digital control logic module and the on-chip oscillator are connected to the micro-slot array. The micro-slot array and the power management unit are connected to the driver module. The driver module, the clock recovery module based on wireless power transmission and the power management unit are connected to the ADC, which is then connected to the backscatter module. The backscatter module is connected to an antenna.

The micro-slot array consists of a plurality of on-chip micro-slot cells, and the micro-slot array is used as a container for PCR reactants.

The power supply module powers the chip through a wireless power supply method. The power supply module includes a rectifier, a power management unit. The input of the rectifier is a signal received from the antenna for alternating current-direct current conversion, to supply power for the chip. The power management unit includes a bandgap reference circuit and few low dropout regulators (LDO). The bandgap reference circuit generates a reference current which is uncorrelated to temperature, as an input to subsequent modules, and further generates a reference voltage uncorrelated to the temperature, as a standard input of the LDOs, to generate a power supply voltage value required by the chip; and the LDO is a typical low dropout voltage regulator, of which one input is a rectifier output and another is a reference voltage from bandgap reference. The function of LDOs is to stabilize a voltage output having a certain ripple of the rectifier at a required VDD voltage value by a negative feedback.

The clock generation module is used for generating clocks at two different frequencies, and is consists of a clock recovery module based on wireless power transmission and an on-chip relaxation oscillator. The clock recovery module deals with the wireless signal that is modulated at the transmission end, and is subjected to on-chip demodulation to obtain a clock signal having a required frequency, which is used as a clock for the ADC. The on-chip oscillator is used as a clock for a digital control logic and a square wave excitation for impedance measurement.

The digital control logic module includes a switch array, and every switch of the array is connected to each cell of the micro-slot array, while the digital control logic module generates the control codeword, complete the gating of the on-chip array in a time-division method, thus tests impedance of every single cell in a period of time.

The driver module has the structure of differential input and differential output, that amplifies and drives voltages at two ends of electrodes of each micro-slot cell, and then drive the successive approximation register (SAR-ADC) at a rear end.

The ADC includes an SAR logic, a capacitive digital-to-analog converter (CDAC), a sampling switch and a CDAC switch, which is used for completing conversion of a voltage signal from analog to digital. The ADC has a single-ended output, and the detected serial signal is connected to the backscatter module.

The backscatter module is used for completing transmission of the wireless signal.

The power-on-reset module is used for generating a reset signal. When the system is powered up, a step from 0 V to the VDD occurs in a power supply signal, and when a voltage is close to the VDD, the module generates a reset signal that is used as a reset input of the digital module and the ADC, ensuring normal operation.

Figure 2:
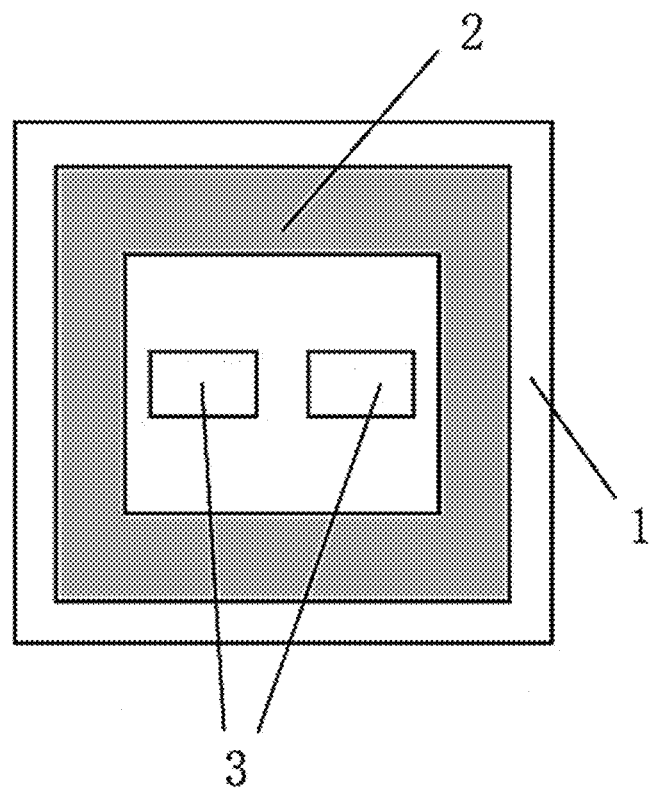
FIG. 2 is a top view of an on-chip micro-slot cell structure of the present disclosure.
Figure 3:
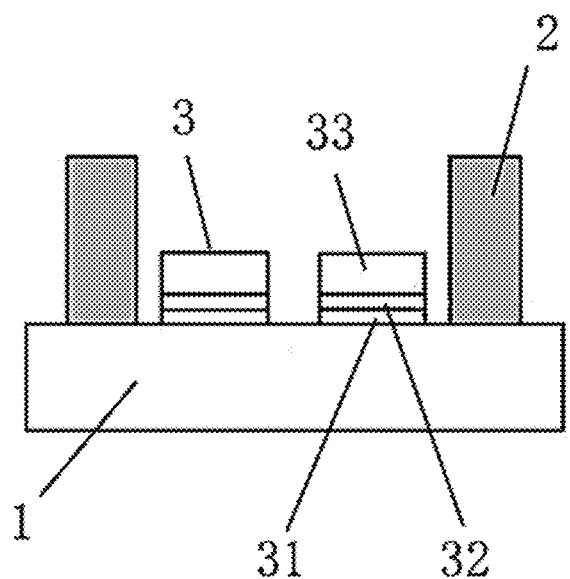
FIG. 3 is a side view of the on-chip micro-slot cell structure of the present disclosure.
Figure 4:
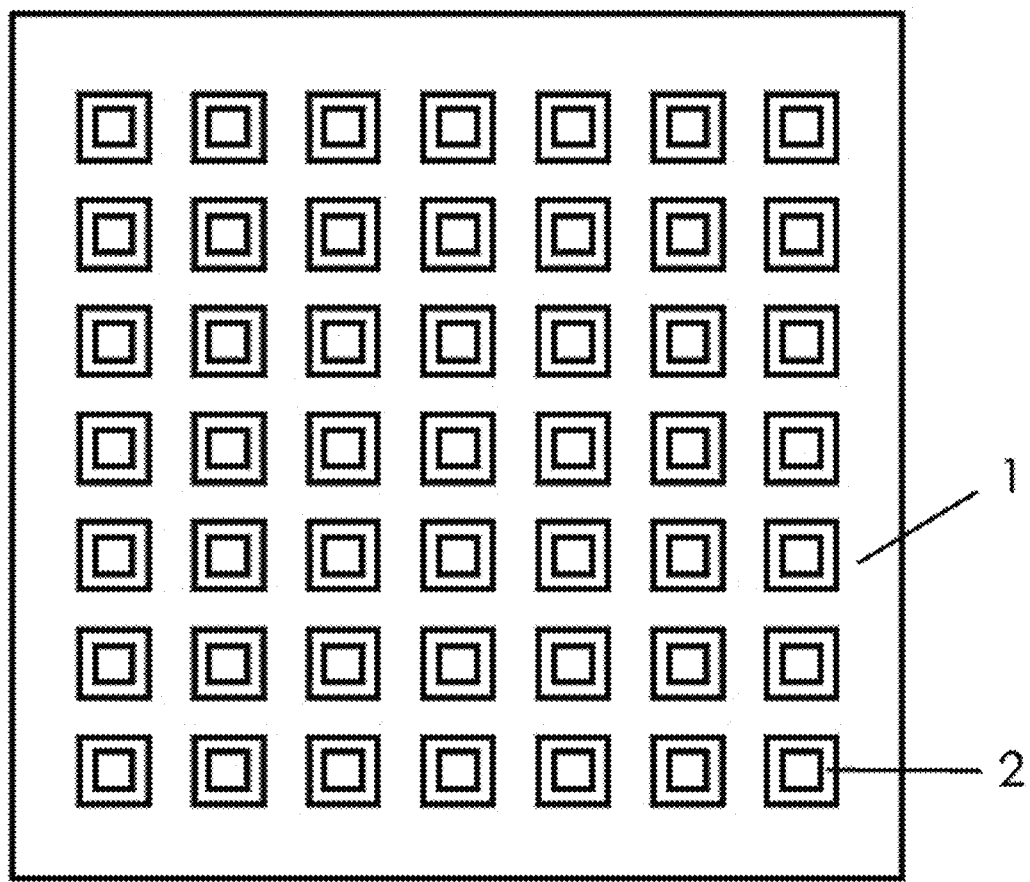
FIG. 4 is a top view of a fully integrated on-chip micro-slot array of the present disclosure.

As shown in FIGS. 2 and 3, a micro-slot cell consists of a chip 1 as bulk, a cubic solution tank 2 and double electrodes 3. The cubic solution tank 2 and the double electrodes 3 are arranged on the chip 1, and the double electrodes 3 are located in a cavity delimited by the cubic solution tank 2. The double electrodes 3 are sequentially, from bottom to top, a first adhesion layer 31, a second adhesion layer 32 and an electrode layer 33. The first adhesion layer 31 is metal Al having a thickness ranging from 10 nm to 30 nm, the second adhesion layer 32 is metal Cr having a thickness ranging from 5 nm to 20 nm, and the uppermost electrode layer 33 is one of metal Au or metal Pt which has a thickness ranging from 50 nm to 200 nm. The first adhesion layer 31, the second adhesion layer 32 and the electrode layer 33 are combined to form an Al—Cr—Au structure. The cubic solution tank 2 consists of SU8 photoresist which has excellent heat resistance, insulation and chemically stability. According to practical applications, the cubic solution tank has a tank hole height and inner diameter that may reach 20 μm to 100 μm. As shown in FIG. 4, the number of micro-slot cells on a single chip 1 depends on the area of a chip, and the density that may reach $2.5*10^9$ cell/m² to $1.2*10^7$ cell/m².

A manufacturing method for the above micro-slot array includes:

step 1, reserve the passivation opening regions of Al as the positions of electrodes of each micro-slot that have a thickness of about 4 μm of double electrodes 3 of each cubic solution tank 2 when a chip 1 is designed.

step 2, fabricate the first adhesion layers by magnetron sputtering covering the passivation opening on the diced chip, and the first adhesion layer 2 covering the passivation openings on 1. The first adhesion layers 2 is metal Al having a thickness ranging from 6 nm to 26 nm.

step 3, carry out stripping in acetone, to obtain Al electrodes of micro-slot cells.

step 4, use deionized water for cleaning, sputter metal Cr and metal Au or metal Pt on an electrode region of the chip 1 in the same manner as in steps 2 and 3, and carry out stripping to obtain an Al—Cr—X (X being Au or Pt) electrode having thickness ranging from 10 nm to 30 nm, 5 nm to 20 nm, and 50 nm to 200 nm respectively.

step 5, spin SU8 photoresist that has a thickness ranging from 20 μm to 100 μm on the chip 1, and carry out photoetching and hardening to obtain a photoresist layer having excellent chemical stability and heat resistance, so as to form concentric-square-shaped cubic solution tanks 2. The concentric-square-shaped cube solution tanks 2 being the micro-slot cells, and is used as containers for PCR reactants.

step 6, finally, use a plasma machine to change hydrophilicity and hydrophobicity, to enable the reactants to smoothly enter the micro-slot cells.

During use, wireless power transmission is to power up the whole PCR chip, and the selected power supply frequency is in a medical electronic frequency band. The wireless signal used for power supply is modulated at the transmission end at the same time, and a clock signal at a required frequency may be obtained after on-chip demodulation, which is used as an ADC clock. A square wave generated by a signal generator is used as the clock of the digital control logic and the excitation for impedance detection. Selection of the frequency band is derived from a test result of the PCR sample, and the frequency band range having the most sensitive resistance change is selected. A square wave signal passes through the sample, to obtain a voltage value (U=I*Z) related to impedance information, is then linearly amplified and driven, which is later input into the ADC for sampling. The backscatter module transmits information and performs discrete Fourier transform (DFT) data processing at a personal computer (PC) end to obtain impedance information, so as to determine negative/positive results.

The detection principle of the digital PCR chip is designed on the basis of an actual test result. PCR reactions with different number of cycles are sequentially carried out on a solution having a specific volume, and an electrochemical workstation CHI660E is applied to measure electrochemical impedance spectroscopy. It is found that with increase in a PCR reaction process, the impedance value of the sample is reduced, and obvious differences are shown at 10 KHz or lower frequency. Therefore, for one micro-slot cell, impedance values before and after the PCR reaction of the micro-slot cell are measured and compared, such that a negative/positive state of the micro-slot cell may be obtained, and final PCR determination may be carried out. For impedance measurement of one micro-slot cell, the square wave is used as an excitation signal, and a higher harmonic may be obtained as an additional excitation signal while low power consumption is achieved. Thus, impedance of f0 (fundamental wave), 3f0 (third harmonic) and 5f0 (fifth harmonic) at three frequency points is measured at the same time, and a voting algorithm is designed at the PC end. Due to potential error factors, single measurement using a single frequency has great uncertainty. Therefore, the harmonic-voting strategy after multi-frequency measurement is used, and when increase in resistance values satisfying expectations occur in frequency points greater than or equal to two, positive is determined, such that accuracy is enhanced while detection efficiency is improved.

It can be understood that the present disclosure is described by means of some examples. As those skilled in the art know, various changes or equivalent replacements can be made to the features and examples without departing from the spirit and scope of the present disclosure. In addition, with the teachings of the present disclosure, the features and examples can be modified to be adapted to specific situations and materials without departing from the spirit and scope of the present disclosure. Therefore, the present disclosure is not limited by the specific examples disclosed herein, and all the examples falling within the scope of the claims of the present disclosure fall within the scope of protection of the present disclosure.

What is claimed is:

1. A digital polymerase chain reaction (PCR) chip with on-chip micro-slot array based on impedance detection, comprising a micro-slot array, a power supply module, a clock generation module, a digital control logic module, a driver module, an analog-to-digital converter (ADC), a backscatter module and a power-on-reset module, wherein:
    the power supply module comprises a rectifier and a power management unit, and the clock generation module comprises a clock recovery module based on wireless power transmission and an on-chip oscillator;
    a wireless signal is accessed to the rectifier, the rectifier is connected to the power management unit, and the power management unit is connected to the power-on reset module, the clock recovery module based on wireless power transmission, the on-chip oscillator, and the digital control logic module;
    the power-on reset module and the on-chip oscillator is connected to the digital control logic module;
    the digital control logic module and the on-chip oscillator are connected to the micro-slot array;
    the micro-slot array and the power management unit are connected to the driver module;
    the driver module, the clock recovery module based on wireless power transmission and the power management unit are connected to the ADC;
    the ADC is connected to the backscatter module, and the backscatter module is connected to an antenna;
    the micro-slot array consists of a plurality of on-chip micro-slot cells, and the micro-slot array is used as a container for PCR reactants;
    the power management unit powers a chip through a wireless power supply method;
    the clock recovery module based on wireless power transmission is used as a clock for the ADC;
    the on-chip oscillator is used as a clock for the digital control logic module and serves as a square wave excitation for impedance measurement;
    the digital control logic module comprises a switch array, every switch of the switch array is connected to each micro-slot cell of the micro-slot array respectively, and the digital control logic module is used to generate a control code to complete time gating of the on-chip micro-slot array, wherein an impedance test is performed to a single micro-slot cell in a period of time;
    the driver module amplifies and drives voltages at two ends of two electrodes of the micro-slot cell, so that the driver module can drive the ADC in back-end;
    the ADC is used for completing the conversion of a voltage signal from analog to digital, wherein the ADC is with a single-end output, and a detected serial signal is connected to the backscatter module;
    the backscatter module is used for completing transmission of the wireless signal; and
    the power-on-reset module is used for generating a reset signal as a reset input of both the digital control logic module and the ADC.

2. The digital polymerase chain reaction (PCR) chip with on-chip micro-slot array based on impedance detection according to claim 1, wherein each micro-slot cell consists of a chip, a cubic solution tank and bottom double electrodes, the cubic solution tank and the bottom double electrodes are disposed on the chip, and the bottom double electrodes are located in a cavity delimited by the cubic solution tank.

3. The digital polymerase chain reaction (PCR) chip with on-chip micro-slot array based on impedance detection according to claim 2, wherein the bottom double electrodes are sequentially, from bottom to top, a first adhesion layer, a second adhesion layer and an electrode layer, the first adhesion layer being metal Al, the second adhesion layer being metal Cr, and the electrode layer being one of metal Au and metal Pt.

4. The digital polymerase chain reaction (PCR) chip with on-chip micro-slot array based on impedance detection according to claim 3, wherein the first adhesion layer, the second adhesion layer and the electrode layer are combined to form an Al—Cr—Au structure.

5. The digital polymerase chain reaction (PCR) chip with on-chip micro-slot array based on impedance detection according to claim 3, wherein the first adhesion layer, the second adhesion layer and the electrode layer have thicknesses ranging from 10 nm to 30 nm, 5 nm to 20 nm, and 50 nm to 200 nm respectively.

6. The digital polymerase chain reaction (PCR) chip with on-chip micro-slot array based on impedance detection according to claim 2, wherein the cubic solution tank consists of SU8 photoresist.

7. The digital polymerase chain reaction (PCR) chip with on-chip micro-slot array based on impedance detection according to claim 6, wherein the cubic solution tank has a tank height and an inner diameter ranging from 20 μm to 100 μm.

8. The digital polymerase chain reaction (PCR) chip with on-chip micro-slot array based on impedance detection according to claim 1, wherein a density of micro-slot cells on a single chip ranges from $2.5*10^9$ cell/m$^2$ to $1.2*10^7$ cell/m$^2$.

9. A manufacturing method for a micro-slot array, comprising:
    step 1, reserving openings of Al as the positions of bottom double electrodes of each cubic solution tank when a chip is designed;
    step 2, fabricating a first adhesion layer covering the openings of Al on the chip by magnetron sputtering, and the first adhesion layer is metal Al;
    step 3, carrying out stripping in acetone, to obtain Al electrodes of micro-slot cells;
    step 4, using deionized water for cleaning, and sputtering metal Cr and metal Au on an upper electrode region of the chip in the same manner as in steps 2 and 3, and carrying out stripping to obtain an Al—Cr—Au electrode;

step 5, spinning SU8 photoresist on the chip, and carrying out photoetching and hardening to obtain a photoresist layer to form concentric-square-shaped cubic solution tanks, and the concentric-square-shaped cubic solution tanks being the micro-slot cells;

step 6, finally, using a plasma machine to change hydrophilicity and hydrophobicity, to enable reactants to smoothly enter the micro-slot cells.

10. The manufacturing method for the micro-slot array according to claim 9, wherein in step 4, after using the deionized water for cleaning, sputtering metal Cr and metal Pt on an upper electrode region of the chip in the same manner as in steps 2 and 3, and carrying out stripping to obtain an Al—Cr—Pt electrode.

* * * * *